(12) United States Patent
Schwarte

(10) Patent No.: US 9,285,786 B2
(45) Date of Patent: Mar. 15, 2016

(54) METHOD FOR DETERMINING ADAPTED MEASURING VALUES AND/OR MODEL PARAMETERS FOR CONTROLLING THE AIR FLOW PATH OF INTERNAL COMBUSTION ENGINES

(75) Inventor: Anselm Schwarte, Bad Abbach (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 1318 days.

(21) Appl. No.: 12/747,917

(22) PCT Filed: Nov. 3, 2008

(86) PCT No.: PCT/EP2008/064875
§ 371 (c)(1),
(2), (4) Date: Jun. 13, 2010

(87) PCT Pub. No.: WO2009/074400
PCT Pub. Date: Jun. 18, 2009

(65) Prior Publication Data
US 2010/0292811 A1    Nov. 18, 2010

(30) Foreign Application Priority Data

Dec. 13, 2007  (DE) .......................... 10 2007 060 036

(51) Int. Cl.
| | | |
|---|---|---|
| G06F 7/00 | (2006.01) | |
| G06F 17/00 | (2006.01) | |
| G05B 13/04 | (2006.01) | |
| F02D 41/00 | (2006.01) | |
| F02D 41/14 | (2006.01) | |
| F02D 41/24 | (2006.01) | |

(52) U.S. Cl.
CPC .......... *G05B 13/041* (2013.01); *F02D 41/0002* (2013.01); *F02D 41/1402* (2013.01); *F02D 41/2451* (2013.01); *G05B 13/042* (2013.01); *F02D 41/005* (2013.01); *F02D 41/0007* (2013.01); *F02D 2041/1422* (2013.01); *F02D 2041/1433* (2013.01); *F02D 2200/0402* (2013.01); *G05B 2219/2623* (2013.01); *G05B 2219/49062* (2013.01)

(58) Field of Classification Search
CPC ... G06N 7/00; F02D 41/0002; F02D 41/1402; F02D 2041/1423; F02D 2041/1433; F02D 2200/0402; F02D 41/2451; G05B 13/042; Y02T 10/42
USPC .................. 701/103; 700/29; 703/2
See application file for complete search history.

(56) References Cited

U.S. PATENT DOCUMENTS

| | | | |
|---|---|---|---|
| 5,889,205 A | 3/1999 | Treinies et al. ............... 73/118.2 |
| 6,029,451 A | 2/2000 | Gärtner ......................... 60/605.2 |
| 6,741,924 B2 * | 5/2004 | Iwasaki et al. ................. 701/114 |
| 7,263,425 B2 * | 8/2007 | Bleile ..................... F02D 41/18 |
| | | | 701/102 |
| 7,457,700 B2 * | 11/2008 | Frauenkron et al. .......... 701/103 |
| 2002/0124828 A1 | 9/2002 | Shirakawa .................... 123/299 |
| 2006/0167612 A1 | 7/2006 | Henn et al. .................... 701/104 |
| 2008/0051979 A1 * | 2/2008 | Yasui et al. .................... 701/105 |
| 2008/0276914 A1 | 11/2008 | Bleile et al. .............. 123/568.11 |

FOREIGN PATENT DOCUMENTS

| | | | | |
|---|---|---|---|---|
| DE | 19734494 C1 | 10/1998 | ............. F02D 21/08 |
| DE | 102004035317 A1 | 2/2006 | ............. F02D 41/00 |
| DE | 102006026219 A1 | 12/2007 | ............. F02D 43/00 |
| EP | 0820559 A1 | 1/1998 | ............. F02D 41/04 |
| EP | 1221544 A2 | 7/2002 | ............. F02D 41/00 |
| EP | 1643101 A1 | 4/2006 | ............. F02D 13/02 |
| WO | WO 2005003535 A1 * | 1/2005 | |

OTHER PUBLICATIONS

Trankler, Hans-Rolf; Taschenbuch der Messtecknik mit Schwepunkt Sensortechnik; Germany, 1996.
Schwarte, Alselm, et al.; Physikalisch-modellbasierte Regelung des Luftpfads von Dieselmotoren Fur Zukunftige Anforderungen; Automatisierungstechnik 55, 2007.
Fortschritt-Berichte; Modellbasierte Fehlererkennung undDiagnose des Ansaug—und Abgassystems von Dieselmotoren, 2007.
Dietz., et al., Zukunftsweisender kleinvolumiger EURO4-Transporter/Commercial-Vehicle Motor/Commerical Vehicle Engine; Internationales Wiener Motorensymposium, 2006
Lin, Andong, "The Combining Forecasting Model on the Condition of the Minimal Sum of the Error Tolerances' Absolute Values and Its Application," Journal of Shanghai Maritime University, vol. 21, No. 3, 9 pages. (Chinese Language w/ English abstract & Statement of Relevance), Sep. 30, 2000.
Chinese Office Action, Application No. 200880122010.5, 11 pages, May 28, 2015

* cited by examiner

*Primary Examiner* — Mahmoud Gimie
*Assistant Examiner* — David Hamaoui
(74) *Attorney, Agent, or Firm* — Slayden Grubert Beard PLLC

(57) ABSTRACT

In a method for determining adapted measuring values and/or model parameters for controlling the air flow path of internal combustion engines, at least two measuring values and/or model parameters are simultaneously adapted, at least one total error variable which describes an inconsistency of the measuring values and model parameters being divided into individual correction variables for the measuring values and/or model parameters to be adapted, and these correction variables being applied to the measuring values and/or model parameters to be adapted.

10 Claims, No Drawings

METHOD FOR DETERMINING ADAPTED MEASURING VALUES AND/OR MODEL PARAMETERS FOR CONTROLLING THE AIR FLOW PATH OF INTERNAL COMBUSTION ENGINES

CROSS-REFERENCE TO RELATED APPLICATIONS

This application is a U.S. National Stage Application of International Application No. PCT/EP2008/064875 filed Nov. 3, 2008, which designates the United States of America, and claims priority to German Application No. 10 2007 060 036.6 filed Dec. 13, 2007, the contents of which are hereby incorporated by reference in their entirety.

TECHNICAL FIELD

According to a first aspect the present invention relates to a method for determining adapted measured values and/or model parameters for controlling the air flow path of internal combustion engines. According to a second aspect the invention relates to a method for determining an adapted setpoint value for the air mass that is to be supplied to an internal combustion engine as a reference variable for an exhaust gas recirculation control system.

BACKGROUND

Metering fresh air mass, recirculated exhaust gas mass and fuel mass in internal combustion engines in a precisely mutually coordinated manner constitutes a growing problem in the wake of more stringent statutory emission limit values. This applies both in the stationary and in the dynamic mode of engine operation. Component and sensor tolerances affect the metering of the individual quantities. This results in considerable emission variations of the internal combustion engine in series production and by way of vehicle aging. Said variations can lead to considerable deviations from the optimal emission-related behavior of the engine. In particular there is the risk that statutory regulations in respect of emissions will be violated.

Furthermore, emissions during the transient, dynamic mode of engine operation are increasingly becoming the focus of engine optimization. In particular in the case of internal combustion engines having EGR the problem of the dynamic metering of fresh air mass, recirculated exhaust gas mass and fuel mass occurs when the boost pressure buildup lags behind the torque request. Under these conditions the requisite fresh air mass and the requisite EGR mass cannot always be provided simultaneously. As a result great disparities in NOx and particle emissions occur in the case of present-day control methods.

Basically a conflict of objectives exists between, on the one hand, the oxygen concentration prior to combustion, which has an impact in particular in terms of the NOx emissions, and, on the other hand, the lambda value or oxygen concentration after combustion, which is of particular relevance in terms of the particle emissions. A suitable compromise must be found between said two objectives (NOx particle tradeoff). This is difficult in particular during the dynamic mode of operation of the internal combustion engine. The NOx particle tradeoff should be optimal in dynamic operation also, however.

Prior art efforts to solve the aforesaid problems were mainly directed at keeping the component and sensor tolerances as small as possible, with consequent high overhead and costs. In dimensioning the emissions of the vehicles, a safety margin with respect to the statutory limit values was also built in to take account of the emission variance in the field. Both known solution paths result in high costs, however. A further, more recent solution path consists in adapting the control to the individual engine. Such approaches are known, for example, from Dietz, Martin et al: "Zukunftsweisender kleinvolumiger Euro4-Transporter/Commercial-Vehicle-Motor" ("Innovative small-volume Euro4 transporter/commercial vehicle engine"), 27th International Vienna Motor Symposium 2006, as well as from EP 1 327 760 B1 and DE 102 42 233 B3. From Lange, Thorsten: "Toleranzeinengung des HFM und Auswirkungen auf die Emissionen" ("HFM tolerance restriction and impact on emissions"), 4th International Exhaust Gas and Particulate Emissions Forum, Ludwigsburg 2006, it is also known to employ a parameter estimation wherein hot film air mass meter (HFM) characteristic curve errors and EGR valve cross-section characteristic curve errors are minimized. With the known methods a variable is adapted in each case. From this there arises the problem that in each case the errors of the remaining variables have an impact on the adapted variable.

In order to solve the problem of the dynamic metering of fresh air mass and recirculated exhaust gas mass, a regulation of the EGR rate was proposed in Dietz, Martin et al: "Zukunftsweisender kleinvolumiger Euro4-Transporter/Commercial-Vehicle-Motor" ("Innovative small-volume Euro4 transporter/commercial vehicle engine"), 27th International Vienna Motor Symposium 2006 and Herrmann, Olaf et al: "Regelung von Ladedruck und AGR-Rate als Mittel zur Emissionsregelung bei Nutzfahrzeugen" ("Regulating boost pressure and EGR rate as a means of controlling emissions in utility vehicles"), Motorentechnische Zeitschrift (MTZ) October 2005. Even with this approach, however, unfavorable emission ratios can result during dynamic operation of the engine. From Rotger, Daniel et al: "Ein modellbasierter Ansatz zur Regelung dieselmotorischer Verbrennungen" ("A model-based approach to controlling diesel engine combustion"), Aachen Colloquium Automobile and Engine Technology 2006, it is also known to control an inverse lambda in the intake manifold. However, this approach can lead to a very small lambda value in the exhaust manifold and consequently to high soot emissions.

SUMMARY

Thus, the problems cited in the introduction cannot be satisfactorily resolved by means of the solutions known from the prior art. Proceeding on the basis of the expounded background art, accoridng to various embodiments, methods of the type cited in the introduction can be provided by means of which the emission limits can be reliably complied with in a cost-effective manner during the stationary and dynamic modes of engine operation.

According to an embodiment, a method for determining adapted measured values and/or model parameters for the purpose of controlling the air path of internal combustion engines, comprises that at least two measured values and/or model parameters are adapted simultaneously by subdividing at least one total error variable which describes an inconsistency in the measured values and model parameters into individual correction variables for the measured values and/or model parameters that are to be adapted and applying said correction variables to the measured values and/or model parameters that are to be adapted.

According to a further embodiment, during the determination of the individual correction variable of a measured value and/or model parameter that is to be adapted a weighting can be calculated as a function of the expected tolerances of the measured value and/or model parameter that is to be adapted in each case. According to a further embodiment, the weighting may be calculated as a function of operating parameters of the internal combustion engine and/or of the age of the internal combustion engine. According to a further embodiment, the individual correction variables may be learned as a function of operating point and preferably stored in engine characteristic maps. According to a further embodiment, at least one total error variable can be determined by means of at least one model equation. According to a further embodiment, at least one model equation may describe the combustion in the internal combustion engine. According to a further embodiment, at least one model equation describes the intake behavior of the internal combustion engine. According to a further embodiment, the adapted measured values and/or model parameters may be used as control variables and/or as input variables for calculating regulation and control variables. According to a further embodiment, further load variables of the internal combustion engine can be adapted by means of a correction variable for an estimated injection mass. According to a further embodiment, a boost pressure setpoint value for the internal combustion engine may be adapted by means of a correction variable for a volumetric efficiency of the internal combustion engine in such a way that a reduced volumetric efficiency leads to a higher boost pressure setpoint value in order to compensate for a reduced cylinder filling. The method as described above may further include the steps as described in the embodiment of a method below.

According to another embodiment, a method for determining an adapted setpoint value for the air mass that is to be supplied to an internal combustion engine as a reference variable for an exhaust gas recirculation control system, may comprise the steps of: determining a first setpoint air mass or a first setpoint exhaust gas recirculation rate which leads to an optimal oxygen concentration prior to combustion in the internal combustion engine, determining a second setpoint air mass or a second setpoint exhaust gas recirculation rate which leads to an optimal oxygen concentration following combustion in the internal combustion engine, and determining an adapted setpoint value for the air mass as a reference variable for the exhaust gas recirculation control system by forming a weighted mean value from the first and second setpoint air masses or from the first and second setpoint exhaust gas recirculation rates.

According to a further embodiment of the above method for determining an adapted setpoint value for the air mass, the weighting can be calculated as a function of the engine operating state and/or a dynamic parameter describing the dynamic behavior of the internal combustion engine. According to a further embodiment of the above method for determining an adapted setpoint value for the air mass, the first setpoint air mass or the first setpoint exhaust gas recirculation rate may be determined as a function of operating parameters of the internal combustion engine, in particular the boost pressure, the injection mass, the boost air temperature, the exhaust gas recirculation temperature, the cylinder volume of the internal combustion engine and/or the volumetric efficiency. According to a further embodiment of the above method for determining an adapted setpoint value for the air mass, the first setpoint air mass can be determined from a setpoint oxygen concentration prior to combustion in the internal combustion engine. According to a further embodiment of the above method for determining an adapted setpoint value for the air mass, the first setpoint air mass can be determined from a setpoint exhaust gas recirculation rate.

According to a further embodiment of the above method for determining an adapted setpoint value for the air mass, the adapted setpoint value for the air mass may be limited at the lower bound by means of an air mass minimum value. According to a further embodiment of the above method for determining an adapted setpoint value for the air mass, at least one measured value and/or model parameter adapted according to the method for determining adapted measured values and/or model parameters as described above can be taken into account for determining the adapted setpoint value for the air mass. According to a further embodiment of the above method for determining an adapted setpoint value for the air mass, the at least one measured value and/or model parameter adapted according to the method for determining adapted measured values and/or model parameters as described above can be taken into account for determining the first setpoint air mass or the first setpoint exhaust gas recirculation rate.

DETAILED DESCRIPTION

According to a first aspect, in a method for determining adapted measured values and/or model parameters for controlling the air flow path of internal combustion engines, at least two measured values and/or model parameters are adapted simultaneously, whereby at least one total error variable which describes an inconsistency in the measured values and model parameters is subdivided into individual correction variables for the measured values and/or model parameters that are to be adapted and said correction variables are applied to the measured values and/or model parameters that are to be adapted.

Models are used to describe the behavior of internal combustion engines and in particular of the air flow path. According to various embodiments the parameters taken into account in said models can be adapted. In addition measured values relating to the behavior of the internal combustion engine, in particular the air path, are recorded by means of suitable sensors and components. According to various embodiments these measured values can also be adapted. According to various embodiments at least two measured values and/or model parameters, i.e. at least two variables from the common group of measured values and model parameters (for example one measured value and one model parameter, etc.) are adapted simultaneously. Toward that end a total error variable describing the expected tolerances of the components and/or sensors recording the measured values as well as the model errors (inconsistency of the measured values and model parameters) is used. The expected tolerances are the measurement errors or model errors that are to be expected. In this regard the standard deviation of such values can be used, for example. From the total error variable an individual correction variable for each measured value or model parameter that is to be adapted is then produced by apportioning the total error variable to the different correction variables. The correction variables for adaption purposes are then applied to the measured values and/or model parameters. The total error variable and the correction variables are preferably total error factors and correction factors. For adaption purposes the non-adapted variables can then be multiplied by the correction factors in each case.

The adaption method according to various embodiments is based on the use of redundant information in the measured variables via a preferably physical model. In the simplest case the model consists of just one equation. All variables and parameters of the equation must be known. The equation can be rewritten such that a 1 remains on one side of the equation. However, said equation is satisfied in the ideal case only. If measured values and assumed model parameters are inserted into the equation, then an inconsistency will occur due, for example, to the component and sensor tolerances. Therefore a total error variable which describes the inconsistency of the measured values and model assumptions is introduced on the side of the equation instead of the 1. The adaption method then uses the total error variable and distributes it as correction variables among the variables of the equation in accordance with the unreliability or assumed standard deviations of the measured variables and model parameters. There accordingly results a simultaneous adaption of multiple variables and parameters of the equation.

The total error variable or the total error factor can be calculated via a model which links the physical variables (measured values) and model parameters to one another. The correction variables or correction factors formed from the total error variable can be stored in characteristic curves or maps or learned. For adaption purposes the correction variables are then distributed among the measured values and model parameters so that the model and the variables are inherently consistent.

The advantage of various embodiments resides in the fact that a plurality of variables are adapted simultaneously and therefore the expected variances of a plurality of variables are taken into account. The individual inaccuracies or tolerances of the sensors and components are assigned to the right variables in the statistical mean, instead of, as in the prior art, only one variable (monocausal) being adapted with the other variables that may also be erroneous. The adaption according to various embodiments thus allows a considerable tightening of the tolerances in respect of the resulting emissions of the internal combustion engine.

At the same time the adaption can also leave a variable unchanged. In the case of a correction factor the correction variable can therefore also be equal to 1, for example. The internal combustion engine can have an exhaust gas recirculation (EGR) control system.

The method is explained below with reference to an example. For the oxygen concentration prior to combustion or, as the case may be, in the intake manifold following an EGR admixture (intake manifold $O_2$ concentration), the following applies to advantageous simplifications:

$$O_2 = O_{2,air} \cdot \left(1 - L_{st} \cdot m_F \cdot \frac{\frac{\eta_{vol} \cdot V_{cyl} \cdot p_{2i}}{R \cdot T_{EGR}} - m_{air} \cdot \frac{T_{air}}{T_{EGR}}}{m_{air}^2 \cdot \left(1 - \frac{T_{air}}{T_{EGR}}\right) + m_{air} \cdot \frac{\eta_{vol} \cdot V_{cyl} \cdot p_{2i}}{R \cdot T_{EGR}}}\right)$$

In this case and also in the further course of the application the meanings are as follows:

$M_{air}$ (fresh) air mass supplied to the engine per stroke (prior to EGR admixture), $n_{Vol}$ volumetric efficiency, $p_{2i}$ inlet pressure or boost pressure prior to combustion in the intake manifold $M_F$ fuel mass per stroke, $T_{air}$ air temperature of the fresh air prior to EGR admixture $T_{EGR}$ EGR temperature (temperature of the recirculated exhaust gas prior to admixture $V_{cyl}$ cylinder displacement volume $O_{2,air}$ oxygen concentration of the fresh air supplied to the internal combustion engine (prior to EGR admixture) (approx. 0.21), $L_{st}$ stoichiometric air/fuel ratio (approx. 14.4 to 14.7).

The above-listed abbreviations also apply in the further course of the present application. The following applies to the lambda value or oxygen concentration after combustion:

$$\lambda = \frac{m_{air}}{L_{st} \cdot m_F}$$

For an internal combustion engine with closed EGR valve, the following applies in the ideal case:

$$\frac{m_{air} \cdot R \cdot T_{air}}{\eta_{vol} \cdot V_{cyl} \cdot p_{2i}} = 1$$

where R denotes the individual gas constant of air or air/EGR mixture (approx. 287-288 J/(kg K)). In the real case an inconsistency arises in the equation due to the component and sensor tolerances. For that reason a total error factor $F_{intake,mdl}$ is introduced:

$$\frac{m_{air,mes} \cdot R \cdot T_{air,mes}}{\eta_{vol,mdl} \cdot V_{cyl} \cdot p_{2i,mes}} = F_{intake,mdl}$$

The index "mes" in each case designates a measured value and the index "mdl" a model parameter.

In order to adapt the air mass and the volumetric efficiency the total error factor $F_{intake,mdl}$ is subdivided into two correction factors $c_\eta$, $c_{air}$ for the volumetric efficiency and the measured air mass:

$$\frac{m_{air,mes} \cdot c_{air} \cdot R \cdot T_{air,mes}}{\eta_{vol,mdl} \cdot c_\eta \cdot V_{cyl} \cdot p_{2i,mes}} = 1, \text{ where } \frac{c_\eta}{c_{air}} = F_{intake,mdl}$$

According to various embodiments, in particular a plurality of physical variables, in particular measured values and model parameters, can be adapted. A plurality of model equations can be used in this case. The advantage then lies in the fact that adaptions based on different models but in part containing identical variables can be formed so as to be consistent with one another. Thus, for example, the air mass adaption from a combustion equation and the air mass adaption from an engine intake behavior equation can be reconciled so as to be consistent with one another and in this way the reliability of the adaption can be increased.

The method according to various embodiments is used preferably in the case of internal combustion engines having exhaust gas recirculation (EGR) systems. In the context of the present applications the determining of a variable can always signify a calculation of said variable. It can, however, also mean, for example, a selection of the variable from an engine characteristic map or similar.

According to one embodiment, a weighting can be calculated during the determination of the individual correction variable of a measured value and/or model parameter that is to be adapted as a function of the expected tolerances of the measured value and/or model parameter that is to be adapted in each case. In this case the correction or adaption variables are calculated via weighting variables which are a measure for the reliability and accuracy of the respective measured values and model parameter variables. The greater the variance of the measured value or model parameter variable, the more strongly said variable will be adapted. The weighting factors can be calculated as a function of operating parameters and/or the age of the engine. It is also possible for the individual correction variables to be learned as a function of operating point and stored in engine characteristic maps.

The at least one total error variable can be determined in a particularly simply manner by means of at least one model equation. In this case at least one model equation can describe the combustion in the internal combustion engine. However, it is also possible that at least one model equation describes the intake behavior of the internal combustion engine.

An example is presented below. The correction factors $c_{air}$, $c_\eta$ are functions of the total error variable $F_{intake,mdl}$, as well as of the associated weighting variables or weighting factors $w_{air}$ and $w_\eta$:

$$[c_{air}, c_\eta] = f(F_{intake,mdl}, w_{air}, w_\eta)$$

The weighting factors $w_{air}$ and $w_\eta$ in turn are functions of the engine rotational speed (N), the load torque or turning moment (TQI) and the age of the internal combustion engine (age):

$$[w_{air}, w_\eta] = f(N, TQI, age)$$

In order to obtain a sufficiently accurate calculation of the correction factors two iterations are performed:

First Iteration:

$$\frac{1}{c'_{air}} = 1 + (F_{intake,mdl} - 1) \cdot w_{air}$$

$$c'_\eta = 1 + (F_{intake,mdl} - 1) \cdot w_\eta$$

$$0 \leq w_{air} + w_\eta \leq 1$$

Second Iteration:

$$F'_{intake} = \frac{1 + (F_{intake,mdl} - 1) \cdot (w_{air} + w_\eta)}{\frac{c'_\eta}{c'_{air}}}$$

$$\frac{1}{c_{air}} = \frac{1}{c'_{air}} \cdot \frac{1}{1 - w_{air} + F'_{intake} \cdot w_{air}}$$

$$c_\eta = c'_\eta \cdot (1 - w_\eta + F'_{intake} \cdot w_\eta)$$

where the identification mark c' or F' in each case designates intermediate results of the iteration.

According to another embodiment, the adapted measured values and/or model parameters can be used as control variables and/or as input variables for calculating regulating and control variables or, as the case may be, advantageous reference variables. According to said embodiment, the results of the adaption are incorporated in a suitable manner into the regulation and control of the internal combustion engine and thereby realize a tolerance restriction in respect of the emissions.

According to a further embodiment, further load variables of the internal combustion engine can be adapted by means of a correction variable for an estimated injection mass. In particular it is possible, by means of a correction variable for a volumetric efficiency of the internal combustion engine, to adapt a boost pressure setpoint value for the internal combustion engine in such a way that a reduced volumetric efficiency leads to a higher boost pressure setpoint value in order to compensate for a reduced cylinder filling. In this way the operating behavior of the internal combustion engine can be further improved.

Following the adaption method according to the first aspect the below-described method according to the second aspect can be performed.

According to the second aspect, in a method for determining an adapted setpoint value for the air mass to be supplied to an internal combustion engine as a reference variable for an exhaust gas recirculation control system, the following method steps are provided: determining a first setpoint air mass or a first setpoint exhaust gas recirculation rate which lead to an optimal oxygen concentration prior to combustion in the internal combustion engine, determining a second setpoint air mass or a second setpoint exhaust gas recirculation rate which lead to an optimal oxygen concentration following combustion in the internal combustion engine, and determining an adapted setpoint value for the air mass as a reference variable for the exhaust gas recirculation control system by forming a weighted mean value from the first and second setpoint air masses or from the first and second setpoint exhaust gas recirculation rates.

In this case the internal combustion engine therefore has an exhaust gas recirculation control system. The first and second setpoint air mass (i.e. fresh air) are in this case the setpoint air masses that are to be supplied to the internal combustion engine prior to the EGR admixture. The possibly adapted variables such as air mass, boost pressure, volumetric efficiency, lambda value, injection mass etc. are factored into the control of the internal combustion engine, either in order to be used directly as a control variable or in order to calculate the reference variables or setpoint values. According to said second aspect the problem of the dynamic adapted setpoint air mass as a reference variable for the EGR control system as well as the optimal tradeoff between NOx and particle emissions of the engine is resolved in that first a provisional setpoint air mass is calculated which represents a 100% prioritization of the oxygen concentration in the intake manifold of the internal combustion engine. Said setpoint air mass leads to very favorable NOx emissions. Furthermore the setpoint air mass is also calculated conventionally via engine characteristic maps substantially as a function of load, the latter corresponding to a 100% prioritization of the air/fuel ratio or, as the case may be, lambda value or oxygen concentration following combustion (in the outlet manifold of the internal combustion engine). Said setpoint air mass leads to very favorable particle emissions. Instead of the first and second setpoint air mass it is also possible to use a first and second setpoint exhaust gas recirculation rate with a corresponding prioritization of the oxygen concentration prior to or following combustion.

In order to find the desired tradeoff between NOx and particle emissions the two oppositely prioritized setpoint air masses are added by way of a weighted averaging function. The adapted setpoint value determined in this way for the air mass to the supplied to the engine (following the EGR admixture) then serves as a reference variable for the exhaust gas recirculation control system.

By means of the weighting a prioritization of the two target variables oxygen concentration prior to and following combustion in the internal combustion engine is realized that is adapted to the situation. According to said aspect a good dynamic balance is achieved between the requested metering of fresh air mass and supplied exhaust gas mass. In particular in the stationary mode of engine operation a good compromise is achieved between the lowering of the oxygen concentration on the engine inlet side for the purpose of reducing NOx emissions and sufficient residual oxygen in the exhaust gas for complete low-soot combustion and consequently low particle emissions. The desired NOx particle tradeoff is thus realized reliably and flexibly also in the dynamic mode of engine operation, with overall emissions being reduced.

The weighting can be calculated as a function of the engine operating state and/or a dynamic parameter describing the dynamic behavior of the internal combustion engine. In this way the desired compromise between NOx and particle emissions can be chosen individually and as a function of the respective operating state of the internal combustion engine. A functional correlation consisting of speed gradient and load variable gradient can serve as a dynamic parameter, for example.

According to another embodiment, the first setpoint air mass or the first setpoint exhaust gas recirculation rate can be determined as a function of operating parameters of the internal combustion engine, in particular of the boost pressure, the injection mass, the boost air temperature, the exhaust gas recirculation temperature, the cylinder volume of the internal combustion engine and/or the volumetric efficiency. In this way the calculation of the adapted setpoint value for the air mass to be supplied to the internal combustion engine can be determined in a particularly flexible manner as a reference variable for an exhaust gas recirculation control system.

In this case the first setpoint air mass can be determined from a setpoint oxygen concentration prior to combustion (and following the EGR admixture) in the internal combustion engine. According to said embodiment, a setpoint oxygen concentration prior to combustion, for example in the intake manifold of the engine, can be calculated by means of an engine characteristic map structure as a function of the operating state of the engine. The first setpoint air mass can be calculated on the basis of the setpoint oxygen concentration prior to combustion and current engine operating variables such as boost pressure, injection mass, boost air temperature, EGR temperature, volumetric efficiency, etc. The advantage of said embodiment lies in the fact that the oxygen concentration prior to combustion is a characteristic variable for describing the effectiveness of the NOx reduction or, as the case may be, the NOx emissions. Instead of performing a model-based calculation of the setpoint oxygen concentration prior to combustion and using it as a control variable, the conversion of the setpoint oxygen concentration into a setpoint air mass is advantageous for the subsequent prioritization and is especially fast, in particular faster than an observer control process. Alternatively or in addition the first setpoint air mass can also be determined from a setpoint exhaust gas recirculation rate.

The calculation of the first setpoint air mass is explained with the aid of the following example:

The first setpoint air mass $M_{air,sp,O2}$ (sp=setpoint) is in this case a function of the setpoint oxygen concentration $O_{2,sp}$ prior to combustion and following the EGR admixture, the air temperature prior to the EGR admixture $T_{air}$, the temperature of the recirculated exhaust gas $T_{EGR}$, the volumetric efficiency $n_{vol}$, the cylinder volume $V_{cyl}$, the inlet pressure $p_{2i}$ and the fuel mass per stroke $m_F$:

$$m_{air,sp,O2} = f(O_{2,sp}, T_{air}, T_{EGR}, n_{vol}, V_{cyl}, p_{2i}, m_F)$$

An Advantageous Model-Based Calculation is as Follows:

$$m_{air,sp,O2} = \frac{2 \cdot c}{-b + \sqrt{b^2 - 4 \cdot a \cdot c}}$$

where $$a = \left(1 - \frac{T_{air}}{T_{EGR}}\right)(O_{2,sp} - O_{2,air})$$

-continued $$b = \frac{\eta_{vol} \cdot V_{cyl} \cdot p_{2i}}{R \cdot T_{EGR}} \cdot (O_{2,sp} - O_{2,air}) - O_{2,air} \cdot L_{st} \cdot m_F \cdot \frac{T_{air}}{T_{EGR}}$$

$$c = O_{2,air} \cdot L_{st} \cdot m_F \cdot \frac{\eta_{vol} \cdot V_{cyl} \cdot p_{2i}}{R \cdot T_{EGR}}$$

In this case the first setpoint air mass can be calculated for different sensor configurations. Equally, certain variables, such as the temperature of the recirculated exhaust gas $T_{EGR}$ for example, can alternatively be calculated via a model.

The adapted setpoint value for the air mass can be limited at the lower bound by means of an air mass minimum value. In this case said minimum air mass is based on a minimum lambda value. According to said embodiment, an unfavorable calibration of the setpoint air mass prioritization is limited such that, for example, in the event of a maximum torque request (kickdown) the requisite maximum air mass will be available in every case.

The two aspects according to various embodiments described can be combined with each other. In particular one or more measured values and/or model parameters adapted according to the first aspect can be taken into account for the determination of the adapted setpoint value for the air mass according to the second aspect. In a particularly advantageous manner the first setpoint air mass or the first setpoint exhaust gas recirculation rate can be calculated with the measured values and/or model parameters adapted according to the first aspect. In this case, for example, the adapted volumetric efficiency, the adapted measured injection mass, the adapted measured boost pressure etc. can be taken into account.

An Exemplary Embodiment is Described Below:

For the simultaneous adaption of a plurality of measured values and/or model parameters two model equations are rewritten in such a way that a 1 stands on one side of the equation. In order to represent the inconsistency of the measured values and model parameters a total error factor which replaces the 1 is introduced in each case.

The following model is produced as result for the intake behavior of the internal combustion engine (intake model):

$$\frac{m_{air,mes} \cdot R \cdot T_{air,mes}}{\eta_{vol,mdl} \cdot V_{cyl} \cdot p_{2i,mes}} = F_{intake,mdl}$$

For the combustion in the internal combustion engine the following model (combustion model) is yielded:

$$\frac{m_{air,mes}}{L_{st} \cdot m_F \cdot \lambda} = F_{combust,mdl}$$

Next, the total error factors $F_{intake,mdl}$ and $F_{combust,mdl}$ are distributed as individual correction factors $c_{air}$, $c_\eta$, $C_p$, $c_F$ and $c_\lambda$ over the associated measured values or model parameters to be adapted in order to establish the consistency of the models:

$$\frac{m_{air,mes} \cdot c_{air} \cdot R \cdot T_{air,mes}}{\eta_{vol,mdl} \cdot c_\eta \cdot V_{cyl} \cdot p_{2i,mes} \cdot c_p} = 1, \text{ where } \frac{c_\eta \cdot c_p}{c_{air}} = F_{intake,mdl}$$

$$\frac{m_{air,mes} \cdot c_{air}}{L_{st} \cdot m_F \cdot c_F \cdot \lambda \cdot c_\lambda} = 1, \text{ where } \frac{c_F \cdot c_\lambda}{c_{air}} = F_{combust,mdl}$$

where:
$C_{air}$ denotes the correction factor for the air mass flow,
$c_\eta$ denotes the correction factor for the volumetric efficiency,
$C_p$ denotes the correction factor for the inlet or boost pressure
$C_F$ denotes the correction factor for the fuel injection mass,
$C_\lambda$ denotes the correction factor for the lambda exhaust gas value At the next step the weighting factors for the correction factors are calculated. The correction factors are in this case functions of the respective total error variable and the weighting factors, where:
$w_\eta$ denotes the weighting factor for correction of the volumetric efficiency,
$W_p$ denotes the weighting factor for correction of the boost or inlet pressure,
$W_F$ denotes the weighting factor for correction of the injection mass,
$W_\lambda$ denotes the weighting factor for correction of the lambda value,
$W_{intake}$ denotes the weighting factor for balancing between the intake and combustion model.

On the basis on the intake model the weighting factors are yielded by means of two iterations:

First Iteration:

$$\frac{1}{c''_{air1}} = 1 + (F_{intake,mdl} - 1) \cdot w_{air1}$$

$$c''_\eta = 1 + (F'_{intake,mdl} - 1) \cdot w_\eta$$

$$c''_p = 1 + (F'_{intake,mdl} - 1) \cdot w_p$$

$$w_{air1} + w_\eta + w_p \le 1$$

Second Iteration:

$$F'_{intake} = \frac{1 + (F_{intake,mdl} - 1) \cdot (w_{air} + w_\eta + w_p)}{\frac{c''_\eta \cdot c''_p}{c''_{air}}}$$

$$\frac{1}{c'_{air1}} = \frac{1}{c''_{air1}} \cdot \frac{1}{1 - w_{air1} + F'_{intake} \cdot w_{air1}}$$

$$c'_\eta = c''_\eta \cdot (1 - w_\eta + F'_{intake} \cdot w_\eta)$$

$$c'_p = c''_p \cdot (1 - w_p + F'_{intake} \cdot w_p)$$

On the basis of the combustion model the weighting factors are yielded as a result of the following two iterations:

First Iteration:

$$\frac{1}{c''_{air2}} = 1 + (F_{combust,mdl} - 1) \cdot w_{air2}$$

$$c''_F = 1 + (F'_{combust,mdl} - 1) \cdot w_F$$

$$c''_\lambda = 1 + (F'_{combust,mdl} - 1) \cdot w_\lambda$$

$$w_{air2} + w_F + w_\lambda \le 1$$

Second Iteration:

$$F'_{combust} = \frac{1 + (F_{combust,mdl} - 1) \cdot (w_{air} + w_\eta + w_p)}{\frac{c''_\eta \cdot c''_p}{c''_{air}}}$$

$$\frac{1}{c'_{air2}} = \frac{1}{c''_{air2}} \cdot \frac{1}{1 - w_{air2} + F'_{combust} \cdot w_{air2}}$$

$$c'_F = c''_F \cdot (1 - w_F + F'_{combust} \cdot w_F)$$

$$c'_\lambda = c''_\lambda \cdot (1 - w_\lambda + F'_{combust} \cdot w_\lambda)$$

In the iterations the suffixes ' and " in each case denote intermediate results of the iterations. The index "air1" was chosen for the air mass flow in the intake model, and the index "air2" for the combustion model.

Subsequently the respective weighted correction factors can be calculated by means of a balancing adaption between the intake behavior model and the combustion model:

$$[c_{air}, c_\eta, c_p, c_F, c_\lambda] = f\left(\begin{array}{c} c'_{air1}, c'_\eta, c'_p, c'_{air2}, c'_F, c'_\lambda, \\ w_\eta, w_p, w_F, w_\lambda, w_{intake} \end{array}\right)$$

$$0 \le w_{intake} \le 1$$

$$w_{combust} = 1 - w_{intake}$$

$$c_{air} = c'_{air1} \cdot \frac{1}{1 - w_{intake} + \frac{c'_{air1}}{c'_{air2}} \cdot w_{intake}}$$

$$c_\eta = c'_\eta \cdot \frac{1}{1 + \left(-w_{intake} + \frac{c'_{air1}}{c'_{air2}} \cdot w_{intake}\right) \cdot \frac{w_\eta}{w_\eta + w_p}}$$

$$c_p = c'_p \cdot \frac{1}{1 + \left(-w_{intake} + \frac{c'_{air1}}{c'_{air2}} \cdot w_{intake}\right) \cdot \frac{w_\eta}{w_\eta + w_p}}$$

$$c_\lambda = c'_\lambda \cdot \frac{1}{1 + \left(-w_{combust} + \frac{c'_{air1}}{c'_{air2}} \cdot w_{combust}\right) \cdot \frac{w_\lambda}{w_\lambda + w_F}}$$

$$c_F = c'_F \cdot \frac{1}{1 + \left(-w_{combust} + \frac{c'_{air1}}{c'_{air2}} \cdot w_{combust}\right) \cdot \frac{w_F}{w_\lambda + w_F}}$$

The following example serves for determining an adapted setpoint value for the air mass that is to be supplied to an internal combustion engine as a reference variable for an exhaust gas recirculation control system:

Initially a first setpoint air mass $m_{air,sp,O2}$ is calculated which leads to an optimal oxygen concentration prior to combustion in the internal combustion engine:

$$m_{air,sp,O2} = \frac{2 \cdot c}{-b + \sqrt{b^2 - 4 \cdot a \cdot c}}$$

where $$a = \left(1 - \frac{T_{air}}{T_{EGR}}\right)(O_{2,sp} - O_{2,air})$$

$$b = \frac{\eta_{vol} \cdot V_{cyl} \cdot p_{2i}}{R \cdot T_{EGR}} \cdot (O_{2,sp} - O_{2,air}) - O_{2,air} \cdot L_{st} \cdot m_F \cdot \frac{T_{air}}{T_{EGR}}$$

$$c = O_{2,air} \cdot L_{st} \cdot m_F \cdot \frac{\eta_{vol} \cdot V_{cyl} \cdot p_{2i}}{R \cdot T_{EGR}}$$

In this case the temperature $T_{air}$ is the air temperature in the air path upstream of the internal combustion engine and prior to the admixture of the recirculated exhaust gas. Alternatively the temperature $T_{cyl,up}$ upstream of the internal combustion engine but after the admixture of the recirculated exhaust gas could also be used. In this case the first setpoint air mass is calculated as follows:

$$m_{air,sp,O2} = \frac{O_{2,air} \cdot L_{st} \cdot m_F \cdot \eta_{vol} \cdot V_{cyl} \cdot p_{2i}}{(O_{2,sp} - O_{2,air}) \cdot \eta_{vol} \cdot V_{cyl} \cdot p_{2i} + O_{2,air} \cdot L_{st} \cdot m_F \cdot R \cdot T_{cyl,up}}$$

In the cited equations, $O_{2,sp}$ denotes the setpoint oxygen concentration upstream of the internal combustion engine but after the admixture of the recirculated exhaust gas.

Another alternative of the calculation of a first setpoint air mass is to determine the latter as a function of an optimal setpoint EGR rate $r_{EGR,sp}$ which leads to favorable NOx emissions in the transient mode of engine operation:

$$m_{air,sp,EGR} = \frac{\eta_{vol} \cdot V_{cyl} \cdot p_{2i}}{R \cdot (T_{air} \cdot (1 - r_{EGR,sp}) + T_{EGR} \cdot r_{EGR,sp})} \cdot (1 - r_{EGR,sp})$$

The calculation is also possible in the case of a measured temperature $T_{cyl,up}$ upstream of the internal combustion engine:

$$m_{air,sp,EGR} = \frac{\eta_{vol} \cdot V_{cyl} \cdot p_{2i}}{R \cdot T_{cyl,up}} \cdot (1 - r_{EGR,sp})$$

A second setpoint air mass can subsequently be determined in the conventional manner, which air mass leads to an optimal oxygen concentration following combustion in the internal combustion engine. From the two determined first and second setpoint air masses an adapted setpoint value for the air mass can then be calculated as a reference variable for the exhaust gas recirculation control system in that a weighted mean value is formed from the setpoint air masses. The weighting can be calculated for example as a function of the engine operating state and thus be flexibly tailored to the respective conditions. According to the first aspect, adapted measured values and/or model parameters can be used for the calculation of the first setpoint air mass.

What is claimed is:
1. A method for determining at least one of adapted measured values and model parameters and controlling the air path of an internal combustion engine, the method comprising:
   operating the internal combustion engine;
   executing an algorithm to adapt at least one of at least two measured values and at least two measured model parameters simultaneously;
   wherein the algorithm defines a plurality of individual correction variables for the at least one of measured values and model parameters as a function of at least one total error variable which describes an inconsistency in the measured values and model parameters; and
   wherein executing the algorithm comprises:
      for each measured value or measured model parameter to be adapted, calculating a weighting value as a function of expected tolerances of the respective measured value or measured model parameter;
      determining values for the individual correction variables based at least on the calculated weighting values and the at least one total error variable; and
      applying said values of said individual correction variables to the at least one of measured values and model parameters that are to be adapted; and
   controlling the operation of the internal combustion engine based on the adapted at least one of measured values and model parameters.
2. The method according to claim 1, wherein the weighting is calculated as a function of at least one of operating parameters of the internal combustion engine and of the age of the internal combustion engine.
3. The method according to claim 1, wherein the individual correction variables are learned as a function of operating point and may be stored in engine characteristic maps.
4. The method according to claim 1, wherein at least one total error variable is determined by means of at least one model equation.
5. The method according to claim 4, wherein at least one model equation describes the combustion in the internal combustion engine.
6. The method according to claim 4, wherein at least one model equation describes the intake behavior of the internal combustion engine.
7. The method according to claim 1, wherein at least one of the adapted measured values and model parameters are used as at least one of control variables and as input variables for calculating regulation and control variables.
8. The method according to claim 1, wherein further load variables of the internal combustion engine are adapted by means of a correction variable for an estimated injection mass.
9. The method according to claim 1, wherein a boost pressure setpoint value for the internal combustion engine is adapted by means of a correction variable for a volumetric efficiency of the internal combustion engine in such a way that a reduced volumetric efficiency leads to a higher boost pressure setpoint value in order to compensate for a reduced cylinder filling.
10. The method according to claim 1, comprising:
    determining a first setpoint air mass or a first setpoint exhaust gas recirculation rate which leads to an optimal oxygen concentration prior to combustion in the internal combustion engine,
    determining a second setpoint air mass or a second setpoint exhaust gas recirculation rate which leads to an optimal oxygen concentration following combustion in the internal combustion engine, and
    determining an adapted setpoint value for the air mass as a reference variable for the exhaust gas recirculation control system by forming a weighted mean value from the first and second setpoint air masses or from the first and second setpoint exhaust gas recirculation rates.

* * * * *